Jan. 13, 1970     O. G. LUNIN     3,489,102
INSTALLATION FOR THE PRODUCTION OF MULTILAYER CAKES
Filed June 27, 1967     8 Sheets-Sheet 1

Jan. 13, 1970     O. G. LUNIN     3,489,102
INSTALLATION FOR THE PRODUCTION OF MULTILAYER CAKES
Filed June 27, 1967     8 Sheets-Sheet 3

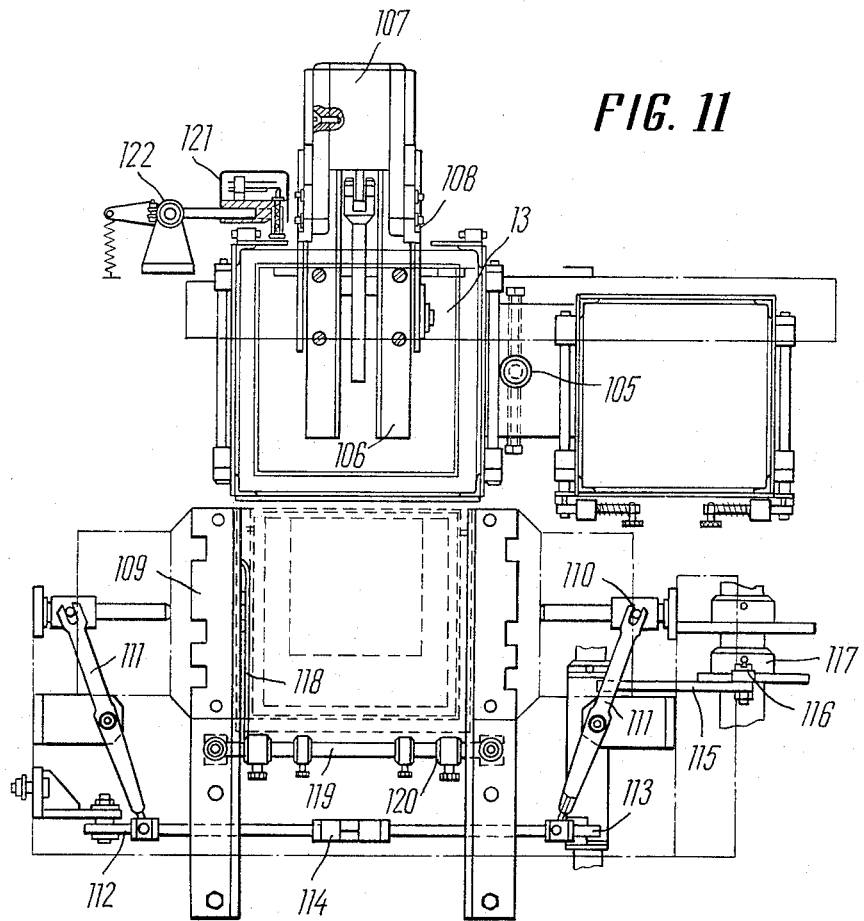

![United States Patent Office]

3,489,102
Patented Jan. 13, 1970

---

3,489,102
INSTALLATION FOR THE PRODUCTION OF MULTILAYER CAKES
Oleg Grigorievich Lunin, Zeleny Prospekt, 24/26, korpus 27, kv. 17, Moscow, U.S.S.R.
Filed June 27, 1967, Ser. No. 649,219
Int. Cl. A23g *3/20*
U.S. Cl. 107—1             8 Claims

ABSTRACT OF THE DISCLOSURE

For the production of multilayer blocks of rectangular cakes there is employed an automated conveyor installation, wherein the number of conveyor lines is equal to the number of layers in the cake block. Baked and cut cake is placed onto the conveyor slats and the conveyor carries the cakes successively through the following operating stages: syrup impregnation of the cakes with simultaneous control weighing on an automatic balance; application of a glossy layer of pastry mass onto the cake surface; placing of the impregnated and mass-covered cakes onto each other; coating the cake block sides with cream and sprinkling crumbles thereon; and placing the finished cakes into boxes automatically fed from a store-holder and placed under the cakes.

---

This invention relates to the production of cakes and more particularly to installations for the production of multilayer cakes.

Known in the art are installations for decorating cake blocks comprising a conveyor for the cake blocks and a device located above said conveyor and intended for the application of pastry mass, for example cream, to the top surface of the cake blocks for instance, a machine for decorating cakes with cream covered by the U.S.S.R. author's certificate, No. 125,208 (1960).

However, the known installations provide but a partial solution to the problem of cake making. One of their disadvantages is that they are not suitable for the application of the pastry mass onto the side surface of a cake block, nor are they suitable for placing decorated cake blocks onto box bottoms.

As for the installations suitable for the making of multi-layer cakes, such installations have not been known at all.

An object of this invention is to provide an installation suitable for the production of multi-layer cakes, with application of pastry mass onto their side surfaces and placing the decorated cake blocks onto the box bottoms.

This object has been attained by the development of an installation for the production of multi-layer cakes, said installation comprising a number of parallel conveyors, each intended for the transportation of a one-layer cake block, said installation further comprising a device mounted above said conveyors and provided with nozzles for the application of pastry mass to the top surface of the cake blocks, said installation comprising also a device for the formation of multi-layer cake blocks which is suitable for transferring one-layer cake blocks, in order to place them one atop the other, from one conveyor to the neighboring conveyor in the transverse direction.

Each of the conveyors can be made of rectangular slotted slats fastened to chains. One of the embodiments of the device for the formation of multi-layer cake blocks is a device which transfers each one-layer cake block to be placed atop another one from one conveyor to the neighboring conveyor, said device comprising a carriage reciprocating transversely to the direction of movement of the conveyors, said device also comprising holders which can close up and then move apart under a cake block, said holders being actuated by a cam drive and a crossmember reciprocating along the axis of the conveyor and connected to the holder through a sliding key fastened to the end of the holder.

Said holders have the shape of plates sheathed with flexible material and contained in housing secured to the carriage.

For placing multi-layer cake blocks onto bottoms of boxes, the installation can comprise a vertical store for empty boxes, with a pusher located in the lower portion of said store and guides for directing the box bottoms from the store onto the slats of the conveyor. Said installation also comprises a lift-drop table for the removal of decorated cake blocks from the slats of the conveyor and for placing them into the bottoms of the boxes, said installation having holders located above said table and capable of closing up and sliding apart under the cake block.

It is expedient that the installation comprise a device for pouring syrup on one-layer cake blocks, said device having a valve with nozzles arranged on a removable plate, and a spring-loaded plate with a flexible liner intended for simultaneous shutting-off of the nozzles, said shut-off plate being mounted on a rod which is moved upward and downward by means of an electromagnet secured to the body of the valve. Said installation also comprises an automatic batching balance for one-layer cake blocks impregnated with syrup, with a contact relay installed in the center of the balance sctle, said automatic relay being intended to shut off the valve through the electromagnet when the weight of the syrupt impregnated in the cake block reaches a specified value, one of the pans of said balance being equipped with a lift-drop table actuated by a cam-and-lever mechanism and intended for removing a cake block from the conveyor slat with the purpose of weighing.

To control the height of lifting and lowering the table during its movement in the device for the application of pastry mass onto the top surface of a cake block which may be of a different height, the rod carrying the table is made in the form of a screw movable in a bushing with a female thread, the drive of said bushing being made as a bevel gear transmission, the shaft of said gear transmission carrying a handle, the gear wheel of said bevel gear transmission being fitted on a hollow shaft the bushing entering therein and being connected to said shaft by means of a key.

For the application of pastry mass onto the side surface of a cake block, and for sprinkling the cake blocks with crumblings, the installation is provided with carriages reciprocating longitudinally and transversely in relation to the conveyor, said carriages having nozzles and attachments, and also a vibratory hopper for the crumblings, said hopper being connected to the nozzles and attachments by means of housings and ejectors for the discharge of the crumblings by means of compressed air.

Other objects and advantages of the invention will be apparent from the following description and accompanying drawing in which the installation in accordance with this invention and the individual units thereof are shown:

FIG. 1 is a general view of the installation;
FIG. 2 is a centering device;
FIG. 3 shows a valve with nozzles for impregnating the cake block with syrup;
FIG. 4 shows a mechanism of a lift-drop table of a batching balance;
FIG. 5 is a lift-drop table of a mechanism for the application of pastry mass onto the top surface of cake block;
FIG. 6 is a top view of a device for forming the multilayer cake blocks;

FIG. 11 is a top view of a store holding box bottoms, and a device for the removal of the cake blocks from the conveyor slats, and for placing them into the boxes.

Figure 3:
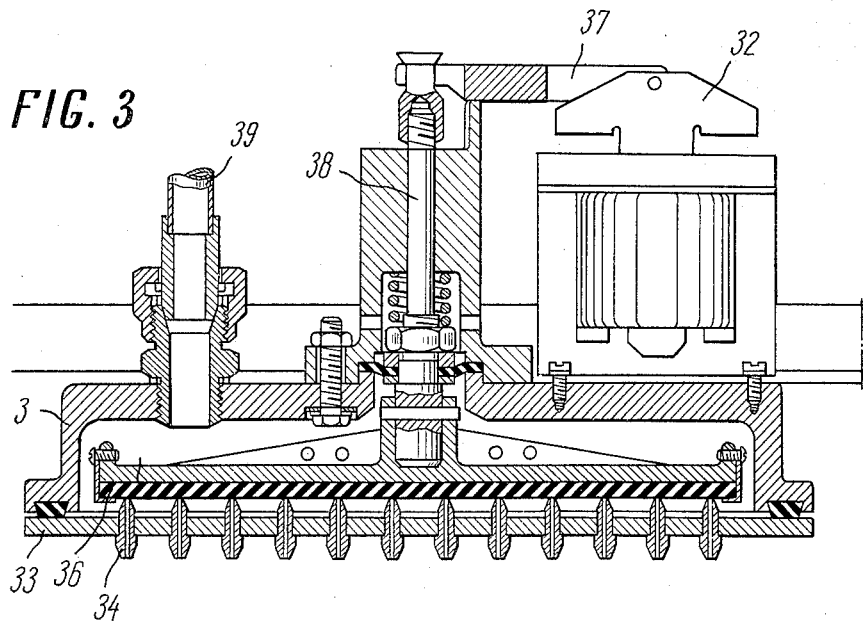
Figure 4:
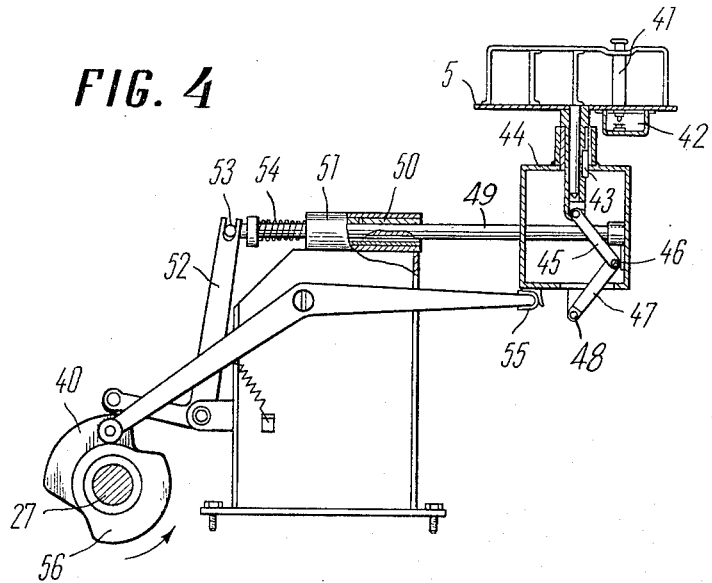
Figure 5:
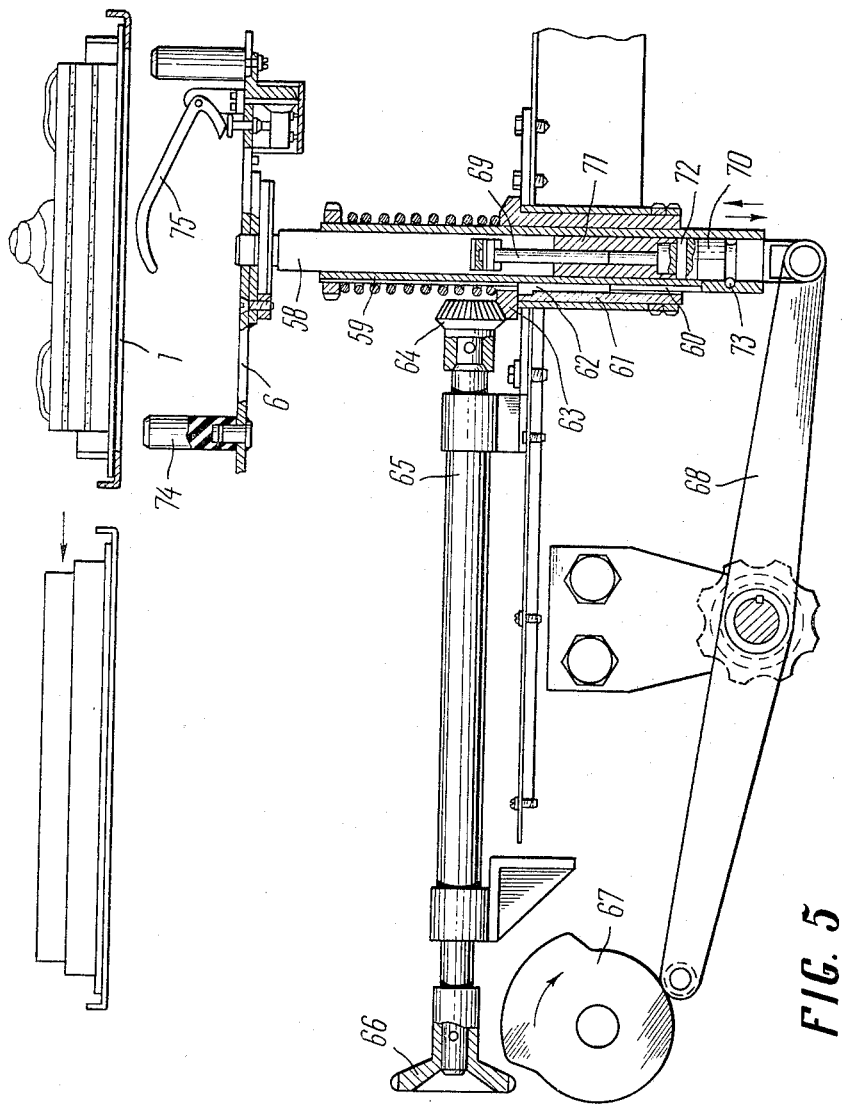
Figure 6:
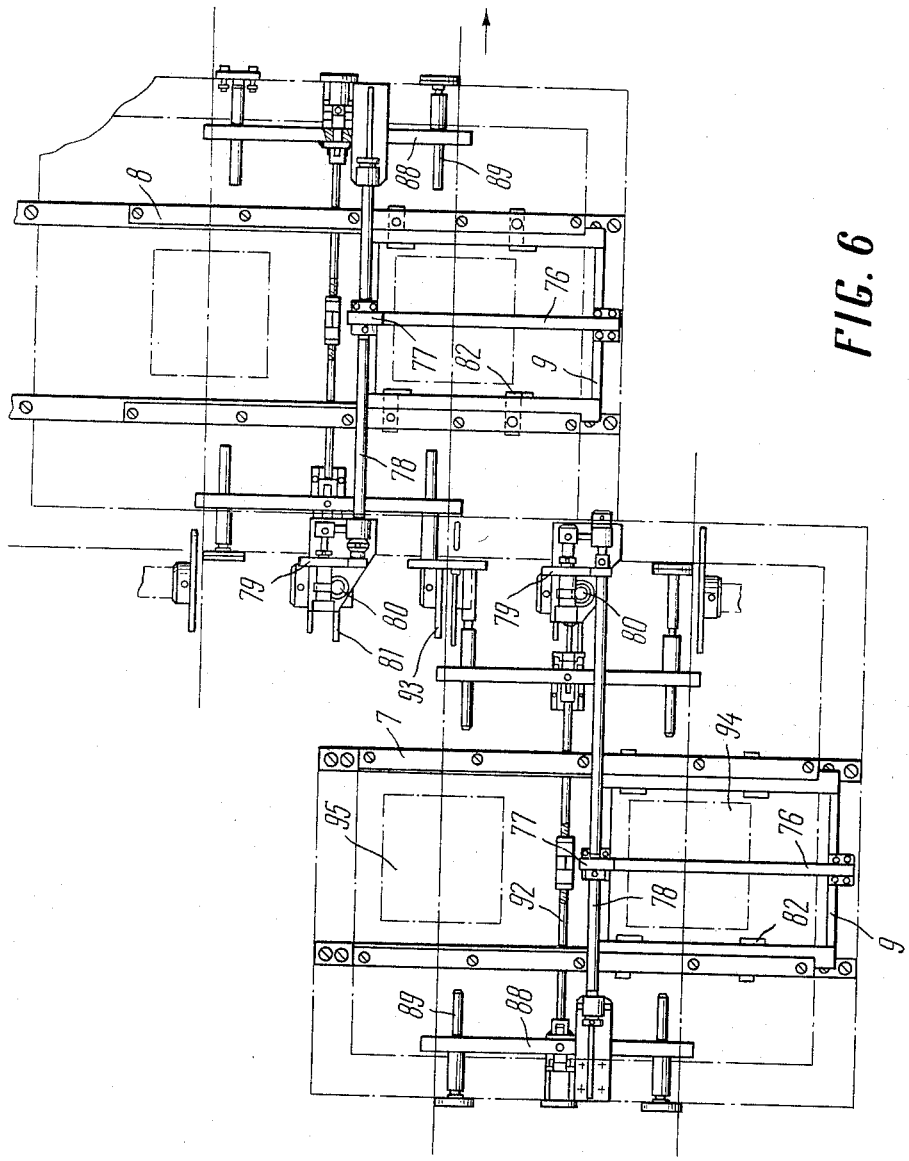
Figure 10:
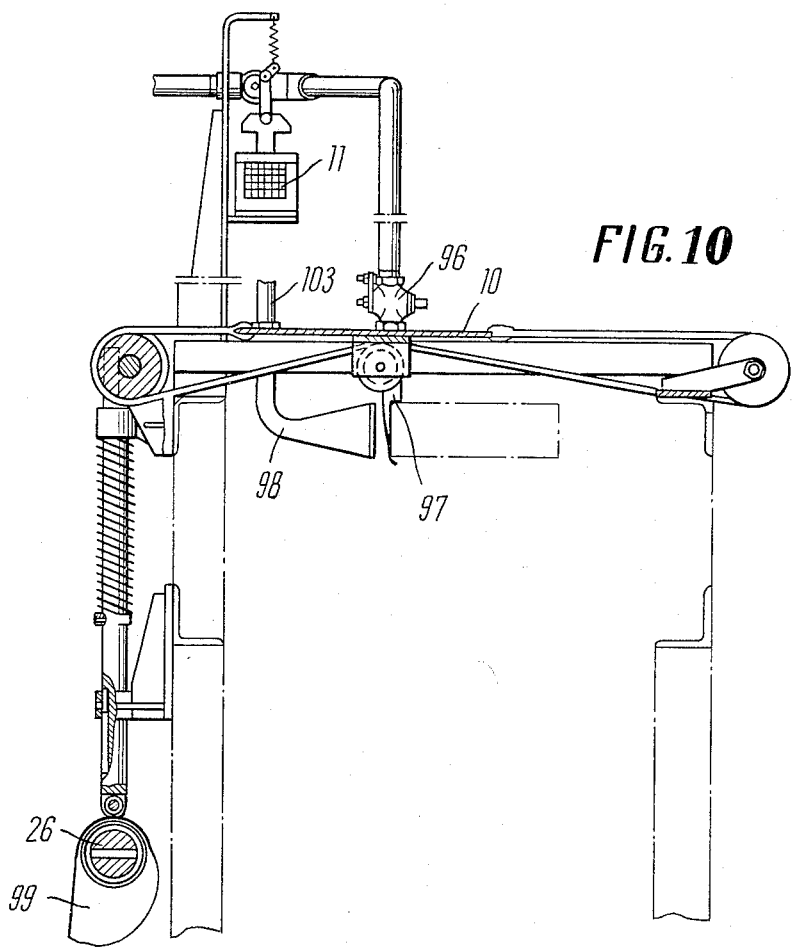
FIG. 10 shows a carriage with nozzles.
Figure 9:
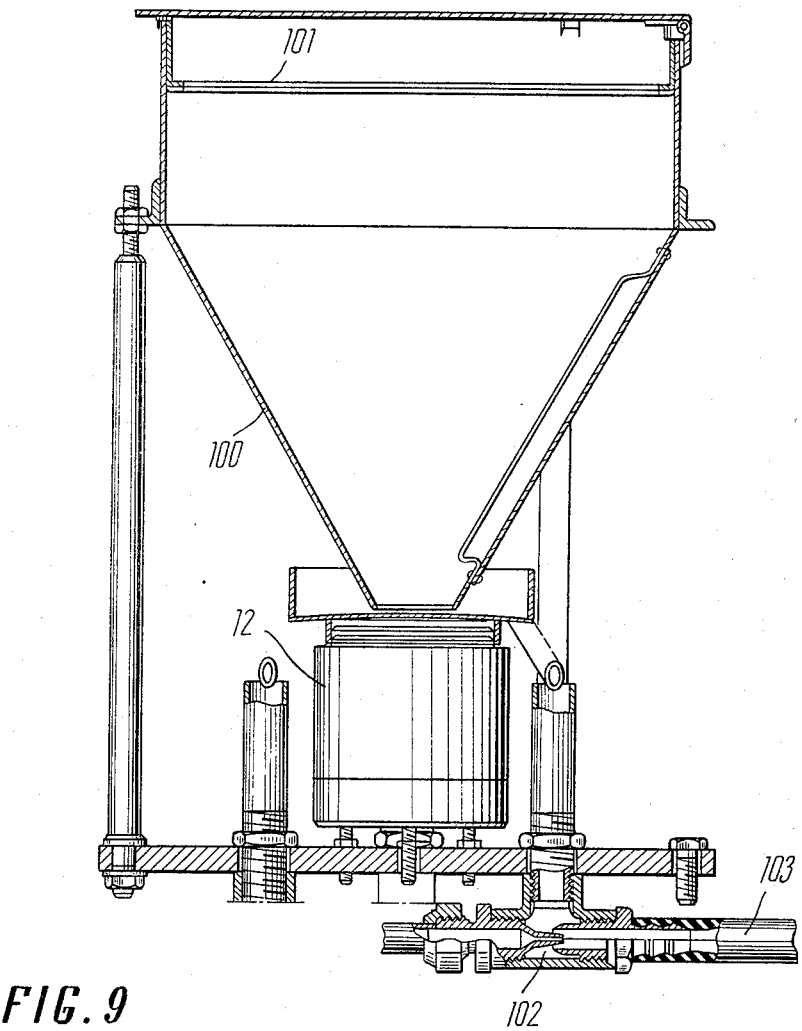
FIG. 9 shows a vibratory hopper with attachments for the crumblings.

The installation comprises the following mechanisms and units: chain slat-type conveyors 1 (FIG. 1); a centering device with movable stops 2 (FIG. 2) for placing biscuits cut to size (cake blocks) in a fixed position onto the slats of the conveyors 1; valves 3 (FIG. 3) for impregnating the biscuits or cake blocks with syrup; an automatic batching balance 4 (FIG. 1) one of whose pans carries a lift-drop table 5 (FIG. 4) for delivering the cake blocks under the valve 3; a device for the application of pastry mass onto the top surface of the cake blocks, said device having a lift-drop table 6 (FIG. 5) for lifting the cake blocks from the conveyor 1 in the process of applying a layer of pastry mass onto said block; a device for forming multi-layer cake blocks, said device having guides 7 and 8 (FIGS. 1 and 6) for the movement of carriages 9; a mechanism for the application of the pastry mass onto the side surface of the multi-layer cake block and for sprinkling it with crumblings, said mechanism comprising a carriage 10 (FIG. 10), an electromagnetic valve 11 and a vibratory hopper 12 (FIG. 9); a store 13 with two sections for box bottoms, barrels 14 (FIG. 1) for various grades of pastry mass and syrup which are supplied to said impregnating and pastry mass applying devices from said barrels owing to the pressure of the air supplied through air pipe 15 equipped with pressure reducing valves 16.

The control system of the installation comprises an electric control board and other apparatus and devices installed in a cabinet 17.

Figure 1:
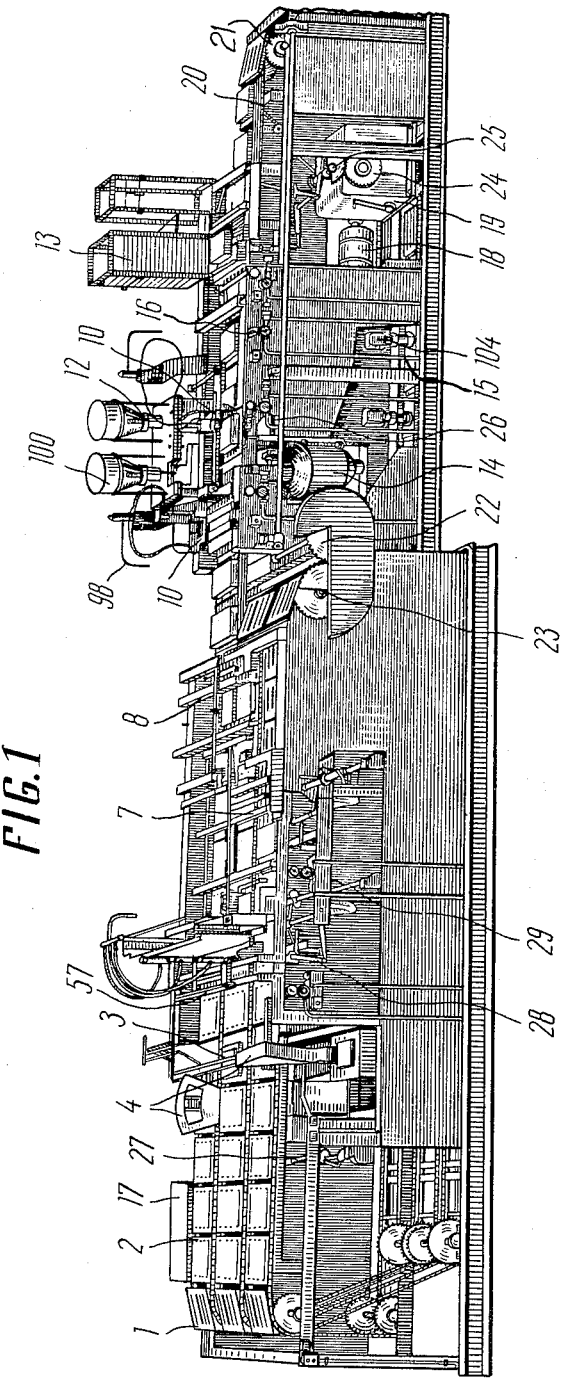

The chain slat-type conveyors 1 intended for the transportation of the cake blocks are set in intermittent synchronized movement by means of a Geneva wheel. The number of conveyors incorporated in the installation is equal to the number of layers in the cake block. For example, for producing a three-layer cake block, the installation employs three conveyors. The slats of the conveyors 1 have longitudinal slots. The rearmost conveyor, as viewed in FIG. 1, is driven by connection of an electric motor 18 to a gear box 19, the output shaft of which is connected to the driver of the Geneva wheel by a chain transmission 20, the Geneva wheel in turn driving the driving shaft of the conveyor. The driving shaft of the conveyor is coupled through two bevel gears 21, two intermediate shafts and a gear train 22 to a common driving shaft 23 of the central and forwardmost conveyors.

A continuously rotating output shaft protruding from the gearbox transmits rotary motion through a gear drive 24 to a camshaft 25. The opposite end of this shaft carries a bevel gear which drives a transmission shaft 26 running along the entire length of the installation on the rear side thereof. The transmission shaft carries a plurality of bevel gears which drive transverse camshafts 27, 28 and 29. Additionally, the longitudinal transmission shaft 26 carries cams for driving individual mechanisms of the installation.

Figure 2:
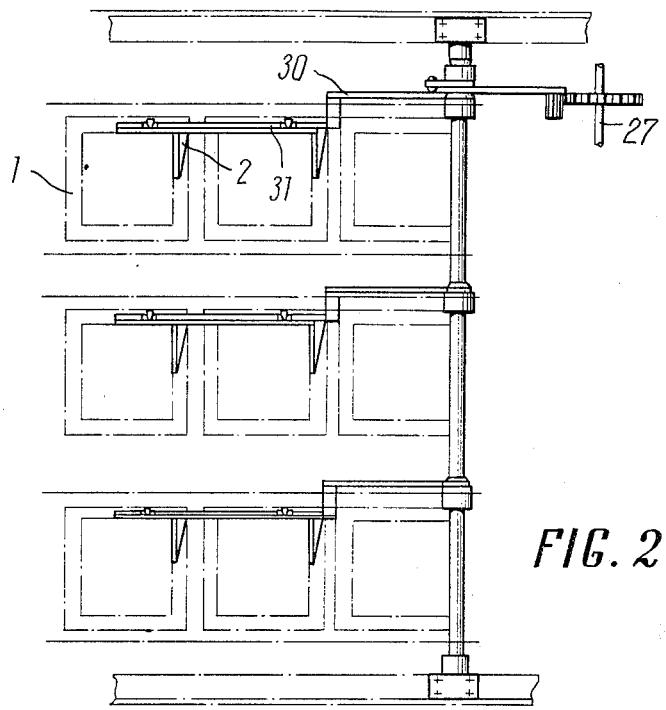

The centering device consists of horizontal strips 31 with angle rests 2, said strips being fastened to swinging links 30 (FIG. 2). The horizontal strips are set in motion by cams on the camshaft 27 which drive links 30. When the conveyor 1 is at rest, the strips are located above the slats of said conveyor. When rectangular biscuit blocks are placed onto the slats of each conveyor 1, the strips are arranged so that they bear against a corner formed by the strip 31 and rest 2. Before setting the conveyor 1 in movement the strips 31 are lifted thus releasing the cake blocks.

To re-set the installation for handling cake blocks of a different size, the angle rest 2 should be shifted along a slot in the strip 31 and fastened in the desired position by a screw.

Installed above each conveyor 1 there is a shut-off valve 3 (FIG. 3) for controlling the impregnation of the cake blocks with syrup. The shut-off valve is essentially a cast body which carries an electromagnet 32. Fastened to the lower open portion of the valve body is a removable plate 33 with nozzles 34. A spring-loaded plate 35 with a flexible lining 36 is held against the nozzles 34.

The plate 35 moves away from the nozzles following the energizing of the electromagnet 32 whose armature acting through a lever 37 pulls a rod 38 upward. The syrup is admitted into the valve through a pipe 39 connected to a syrup barrel 14. The plate 35 shuts off the nozzles 34 after the electromagnet 32 is de-energized, owing to the action of a spring. When necessary, the plate 33 with the nozzles 34 can be replaced by a plate of a different size.

The electromagnet 32 of the valve is energized from an electric control board after the conveyor 1 is stopped (FIG. 1). The electromagnet is de-energized by means of a contact installed on the batching balance 4 after the weight of the biscuit block impregnated with syrup reaches a specified value. In order to activate the electromagnet 32, the electric control board is provided with a cam shaft, rotating synchronously with the transmission shaft 26. At that moment when the conveyors stop, one of the cams of the electric control board closes the electric contact connected to the electromagnet 32.

The installation comprises two devices for weighing the cake blocks in the course of their being impregnated with the syrup (see FIG. 3), one of these featuring two life-drop tables, and the other, one such table. This device is based on a conventional shop-type balance 4, for example, Model BHII-10, in which the square has been replaced, and the scale extended to 50–100 g. In the center of the balance scale a relay is installed, for example, Model PIIT-100, with a contact blocking the path of movement of the balance pointer. The pan of the balance carries the lift-drop table 5 (FIG. 4) actuated by a cam 40 rotating on the shaft 27. Built into the table is a push-button 41 of an electric feeler 42. The rod of the table passes through a bushing having a key 43. The bushing is installed in a body 44 fastened to the pan of the balance. The lower end of the rod is hinged to a lever 45 which is connected by means of an articulated joint 46 to the lever 47 swinging in an articulated joint 48. The articulated joint 46 has a shank which fits into the fork of a pusher 49 movable in a guide bushing 50 of a bracket 51 installed on a base frame. The pusher is forced to move to the right by the cam 40 fastened to the shaft 27 through an angle lever 52 and a sliding articulated joint 53. The pusher is reversed by the action of a spring 54. When the pusher is moving to the left, the fork of the pusher 49 turns the levers 45 and 47 which lift the table 5. When the fork moves to the right the table 5 is lowered.

When the conveyor 1 with biscuit blocks is in movement, the lugs of the table 5 are located under the slats of the conveyor 1. After the conveyor 1 is stopped, the table 5 is lifted so that its lugs pass through openings in the slat of the conveyor 1 and support a dry biscuit block. Commencing from this moment, the biscuit block is being weighed and simultaneously impregnated with syrup from the nozzles 34 of the shut-off valve 3. As a result the pan of the balance is gradually lowered. The pointer reaches the contact relay which is now energized and self-interlocked. The relay cuts off the electromagnet 32 of the pouring valve 3. On completion of the working cycle the table 5 of the balance is lowered, the cake blocks are put down onto the conveyor 1 and the balance is returned to the initial position. The quantity of the syrup to be poured onto a cake block depends upon the weight placed on the other pan of the balance. For each particular type of cake a corresponding weight is specified.

If there is no cake block on the balance pan, the contact of the feeler 42 is not pressed, and the shut-off valve 3 controlling syrup pouring remains closed.

To prevent the table lifting mechanism from affecting the operation of the balance the following provision has been made. Prior to table lifting, a lever 55 actuated by a cam 56 is positioned under the body 44. After the termination of the table lifting, the lever 55 moves down and no longer contacts the table body 44. Prior to table lowering, the lever 55 moves upward again and prevents the body 44 from possible shifting.

The mechanism for the application of pastry mass, for example, of cream, onto the top surface of a cake block is located on the base frame above the conveyor 1 (see FIG. 1), and comprises a carriage 57 equipped with three valves with slotted attachments through which the pastry mass is deposited onto the surface o fthe cake block. The carriage 57 moves along the guides installed above the conveyor in the transverse direction, the carriage 57 being driven by a cam fixed on the distributing shaft 26.

The mechanism for the application of pastry mass onto the top surface of cake blocks is synchronized with a lift-drop appliance which, prior to the application of cream onto the cake blocks lifts the cake blocks from the slats of the conveyor 1, after the latter is stopped. After the carriage 57 completes its working stroke and the process of pastry mass application onto the block surface is completed, the device lowers thus leaving the cake blocks on the slats of the conveyor. The lift-drop appliance having the shape of a table (FIG. 5) is mounted on a screw 58 interacting with the thread of a bushing 59 having a key groove 60 and fitting into a hollow shaft 61 inside which it is aligned by means of a key 62.

Fixed on the outer surface of the shaft 61 is a bevel gear 63 meshing with a bevel gear 64 mounted on a horizontal shaft 65 driven by a handle 66.

Automatic lifting and lowering of the table 6 is ensured by a cam 67 through a swinging lever 68 connected to the lower end of a plate 69 with the aid of a clevis 70. The plate 69 passes through a guide bushing 71 which is connected to the clevis 70 by means of a stud 72.

The clevis 70 is connected to the bushing 59 by means of a pin 73. The height of the table (i.e., its additional lifting or lowering) is controlled as follows. When the handle 66 is rotated, the gear 64 is driven in rotation as well, thus causing the shaft 61 to rotate. Through the key 62 the rotary motion of the shaft 61 is transmitted to the bushing 59. Since the screw 58 is connected by the plate 69 to the clevis 70 which does not rotate about its axis, the screw 58 does not rotate either, but owing to the rotation of the bushing 59 the screw reciprocates only up and down in relation to the bushing. In this way the height of the table 6 is varied while the table is being moved by means of the cam 67.

Control of the height of lifting of the table 6 in the course of its movement is necessary to ensure a uniform deposition of the cream pattern in the course of decorating operations, on cake blocks of various heights.

The table 6 is provided with lugs 74 which, in the course of the table lifting, pass through the openings in the slats of the conveyor 1 and lift the biscuit blocks located on the slats. The mechanism is equipped with an interlocking device made as a feeler 75. Should, for any reason, there be no cake block on the lifted table the feeler 75 does not operate thus causing the opening of the electric circuit supplying the electromagnet which controls the pastry mass feed valves. In this case the signal given by the electric control board does not reach the electromagnet and the valves remain closed.

The installation for the production of three-layer cake blocks comprises two mechanisms for forming multi-layer cake blocks. In the first of these mechanisms the transverse guides 7 are located above the right-hand and the central conveyor. In the second mechanism the guides 8 are located above the central and the left-hand conveyor.

Figure 7:
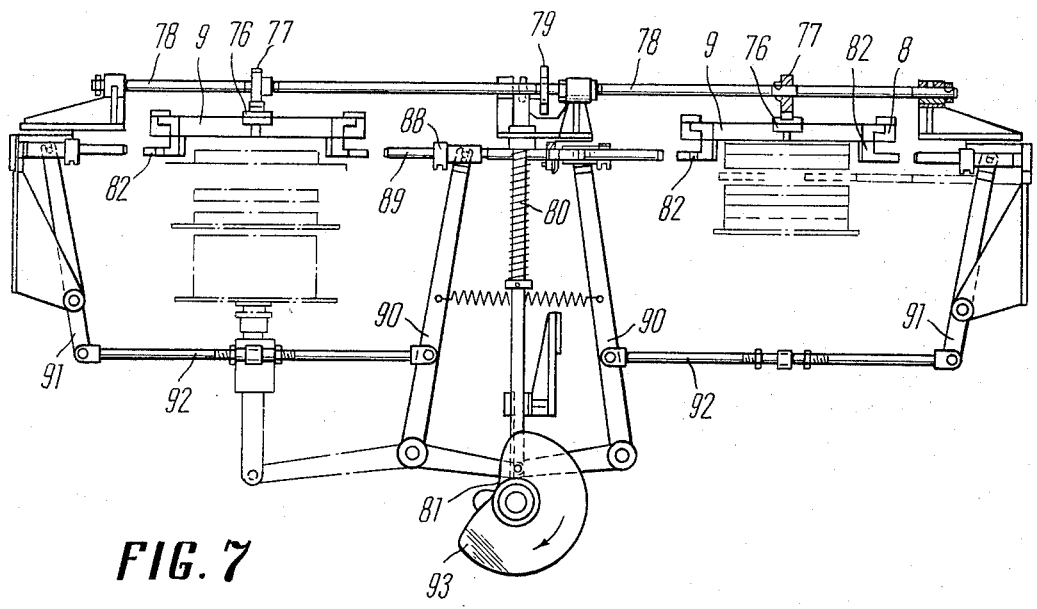
FIG. 7 is a side view of the device, shown in FIG. 6.

Moving along the guides are the carriages 9 (FIGS. 6 and 7) made as frames having toothed racks 76 which mesh with gears 77 fastened to shafts 78. Through gear pairs 79 the shafts are driven in rotation from vertical toothed racks 80 which reciprocate under the action of cams 81. In this way the cams 81 make the carriages 9 intended for transferring cake blocks from one conveyor to another reciprocate. The carriages 9 have lugs 82 to which the housings of cake block holders are fastened.

Figure 8:
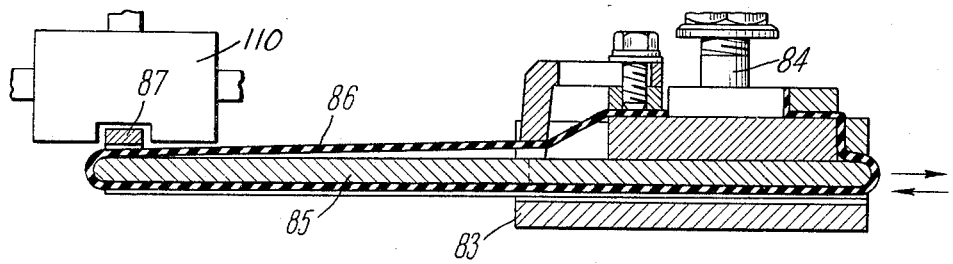
FIG. 8 shows a cake block holder.

A cake block holder consists of a left-hand and a right-hand part. FIG. 8 shows a left-hand part of a holder. The holder comprises a housing 83 fastened to the carriages 9 by bolts 84, and a movable plate 85. The plate has two slots so that one of its edges forms what can be regarded as a fork with three projections, with three flexible bands 86 fitted on them. The ends of the bands are made fast in the housing 83.

The plate 85 can reciprocate inside the housing 83, the projections of the forks remaining permanently covered with the band. The plates 85 of the left-hand and right-hand parts of the holder either close up or move apart. In the course of this movement, they either contact each other, or move away from each other. If a cake block is placed on the plates which are closed up and then moved apart, then in the course of movement of the plates 85, the cake block rests on the bands 86, without contacting the surface of the moving plates 85. Then the bands 86 are retracted following the moving projection of the plate, without sliding along the lower surface of the cake block. As a result, in the course of movement of the plates 85 the cake block remains in a state of rest, and only after the plates move sufficiently far away from each other is the cake block lowered. In this way, the cake block which has been placed earlier on the bands 86 of the contacting plates of the holder is transferred atop another cake block located below.

The plates 85 carry feathers 87. When the left-hand and right-hand parts of the holder contact the projections of the carriage 9 the feathers 87 enter the slots of two cross-members 88 moving on guides 89 along the axis of the conveyor. The cross-members are set in motion by swinging levers 90 and 91 connected by link 92. The lever 90 is of angular design.

Thus, the plates of the holder can make two movements, namely, in the transverse direction together with the carriage 9, and in the longitudinal direction together with the cross-member 88.

Each mechanism for forming multi-layer cake blocks has two lift-drop tables which are set in movement by cams 93. This mechanism operates as follows. After the right-hand conveyor 1 is stopped, a table 94 lifts a cake block and comes to rest. The plates 85 of the holder close up. Thereafter the table is lowered while the cake block remains on the bands 86 of the closed-up plates 85 of the holder. Next the carriage 9 transfers the holder in the transverse direction and stops it above a table 95. By this time the table 95 slightly lifts the cake block from a slat of the central conveyor 1. The plates move apart and the cake block which has been taken from the right-hand conveyor is placed atop the cake block located on the central conveyor 1. Thereafter, the carriage 9 returns to its initial position.

The second mechanism operates concurrently with the first one. The second mechanism removes a double-layer cake block from the central conveyor and places it atop a one-layer cake block located on the left-hand conveyor, thus forming a three-layer cake block.

When only double-layer blocks are to be produced, the left-hand and the central conveyors are used for the purpose. In this case a cake block removed from the central conveyor is placed on a cake block located on the left-hand conveyor.

The machine comprises two mechanisms for the application of pastry mass onto the side surface of a multi-layer cake block and for sprinkling it with crumblings. The carriage 10 (FIG. 10) of one of the mechanisms is installed above the conveyor 1 so that it can move in the transverse direction for the purpose of depositing the pastry mass and crumblings onto the lateral sides of the cake block. The carriage of the second mechanism is installed so that it can move along the conveyor 1 for the purpose of coating the longitudinal sides of the cake block with cream.

Each carriage is equipped with two plug-type cocks 96, with two nozzles 97 fastened to said cocks by means of coupling nuts, said nozzles being intended for the application of a thin layer of cream to the sides of a cake block. The handles of the cocks 96 are connected to each other by means of a link. The cocks 96 are controlled by means of the electromagnet 11. The cream is supplied to the cocks 96 through hoses.

The carriage also carries two attachments 98 intended for sprinkling the sides of a cake block with fine biscuit crumblings.

The carriage 10 is caused to reciprocate by a cam 99 fitted on the distributing shaft 26.

The unit incorporates a lift-drop table which, after the conveyor is stopped, lifts the cake block from the conveyor slat. After the carriage 10 completes its working stroke, and the sides of the cake block are coated with cream and sprinkled with crumblings, the table lowers the cake block back onto the conveyor. The carriage makes the reverse stroke while the cake block is being carried on the conveyor, so that the attachments of the table do not contact the cake block.

The same mechanism comprises a charging hopper 100 (FIG. 9) which is filled with crumblings through a screen 101, a vibratory hopper 12 installed under the discharge opening of the charging hopper 100, and two ejectors 102 into which the crumblings uniformly flow owing to vibration of hopper 12. In the ejector 102 the crumblings are entrained by compressed air flow and are in this way delivered through flexible hoses 103 to the slotted attachments 98 fastened to the carriage 10. Compressed air is supplied to the ejectors 102 only during working stroke of the carriage 10. The compressed air supply is tuned on and shut off by means of electromagnetic valves 104 (FIG. 1).

The valves and the electromagnetic are controlled by means of the electric control board in a manner similar to that of the control of electromagnet 32.

The mecahnism ensuring the supply of empty boxes and placing multi-layer cake blocks into the boxes is located at the tail end of the installation. The store 13 is installed beside the conveyor 1. It consists of two sections intended for boxes of different sizes, for example, for 1-kg. and 0.5-kg. cakes. When re-setting the equipment for the production of the cakes of another weight, the store 13 should be turned respectively about it fixed axis 105. The store 13 has no bottom so that the lowermost box located inside the store bears upon fixed guides 106 along which the plate of a pusher 107 slides, said pusher being intended for pushing out the lowermost box onto the projections of the lifting device. The box is pushed out by means of the stops 108 fastened to the plate of the pusher 107. Located above the conveyor in a transverse direction are brackets 109 to which are fastened, respectively, the housing of the left-hand and the right-hand parts of the cake block holders. The holders are designed similarly to the holders of the mechanism for forming three-layer cake blocks. However, here the housing of the holder is fixed in its position along the axis of the conveyor, so that only the plates with the bands are movable. When the holder is installed in position, the vertical keys 87 fit into the mating slots of slides 110 (FIG. 8) which are movable along longitudinal guides by means of swinging levers 111. The latter are set in motion by means of vertical levers 112 and 113 connected to each other by a link 114. The lever 113 is fitted onto bushing 123 which has a shank 115 with a roller 116 bearing upon a cam 117 whereby to release and lock the holder under the action of the cam 117.

An empty box pushed out from the store is centered by guide plates 118 fastened to an axis 119. By means of setting screws 120 the plates are positioned on the axis 119 at a distance corresponding to the width of the box to be handled.

For checking whether there are empty boxes in the store an electric feeler is provided. The feeler comprises two normally closed contacts 121 accommodated in a casing fixed on a vertical turnable rod 122. Owing to the action of a cam mechanism, the casing of the contacts is set in swinging motion so that prior to the pushing-out of a box the feeler enters the box store. The lower contact is installed at the level of the second box from the bottom, while the upper contact is positioned at the level of the tenth box. When there are ten boxes in the store, the contacts bear against the sides of the boxes and remain open, thus ensuring normal functioning of the mechanism. However, when the number of the cake boxes in the store is less than ten, the upper contact which will encounter no obstacle will remain closed thus actuating a light signal meaning "boxes needed." When only one box is left in the store, the lower contact fails to bear against the second box, and the electric motor driving the mechanism is caused to stop.

The box stores have the doors normally locked by means of pawls. By moving the handles together, the pawls are turned as required for releasing the doors which now can be opened. A stack of 15–20 empty boxes is placed into the store, the boxes being held above the pawls which prevent the stack from dropping, then more boxes are placed into the store in a similar way. After the store is filled, the doors are closed, the pawls now moving out of the store thus permitting free downward movement of the boxes.

The barrels 14 for the pastry mass (FIG. 1), provided with a hermetically sealed covers and water jackets ensuring the required temperature of the mass, are filled manually. Each mechanism is equipped with two cream barrels: a service barrel from which the cream is being consumed, and a stand-by barrel which is being concurrently filled. The barrels rest on springs. After being emptied, the barrel is lifted by the springs, closes electric contacts and actuates a light signal device meaning "cream wanted." The cream is squeezed from the barrel by compressed air charged through flexible hoses, and is fed to the respective mechanism which applies it to a cake block. The air main 15 connected to a compressor is laid along the installation. From the air main, branch pipes are run to pressure reducing valves provided with pressure gauges. The reducing valve provides for the control of air pressure in the cream barrel, thus varying the quantity of the cream supplied to the cake block.

Syrup barrels are designed similarly. The syrup is charged into the barrels from a service tank by a pump.

A synchronous operation of all the units and mechanisms of the installation is ensured by cam drives from the transmission shaft 26 making one complete turn during one working cycle of the conveyors.

All the electromagnetic valves and cocks for the supply of syrup, cream and crumblings are opened and closed by means of the standard electric control board in the manner described for electromagnet 32. To ensure dependable synchronization, the cam drum of the electric control board is driven not by a separate electric motor but by means of a chain transmission from the transmission shaft 26 of the installations.

The installation operates as follows.

During one working cycle of the installation the transmission shaft 26 and all the cam shafts make one complete turn, while the conveyors 1 move through a distance equal to one pitch length between the conveyor slats, and then pause driving the performing of all the process operations. The biscuit blocks are carried by the conveyors successively through all the mechanisms of the installation.

The biscuit blocks which have been baked and cut into squares beforehand are placed manually onto the slats of the conveyors 1. At the moment of placing of the blocks onto the conveyor slats, the angle rests 2 of the centering device are positioned above the slats of the conveyors and the biscuit block is slightly pressed against the corner of the rest. Then the rests 2 are lifted and the cake blocks move together with the conveyor below the rests towards the pouring valves 3, where they stop. The tables 5 of the balance 4 are lifted by means of the lever-and-cam mechanism, the lugs of the tables passing through the slots in the conveyor slats, thus lifting the cake blocks. At this moment the electric control board activates the pouring valves 3. When the cake blocks impregnated with syrup reach a specified weight, the balance 4 shuts off the pouring valves 3, the tables 5 of the balance 4 move down and the sprayed cake blocks are placed back onto the slats of the conveyors 1.

Thereafter the cake blocks are delivered under the mechanism for the application of pastry mass onto the surface of the cake blocks. After the conveyors are stopped, the cake blocks are lifted from the conveyor slats by means of the lift-drop tables 6. The electric control board simultaneously opens the valves feeding the pastry mass. After the application of a layer of the pastry mass, the cake blocks are lowered back onto the conveyors which carry them under the mechanism for forming multi-layer cake blocks.

To produce a three-layer cake block, the biscuit blocks impregnated with syrup and coated with cream must be accurately placed one atop the other. After the conveyors stop, the mechanism for forming three-layer cakes removes a block from the right-hand conveyor and moving along the guides carries it in the transverse direction, and then places it onto a cake block located on the central conveyor. The double-layer cake block formed in this way is carried by the central conveyor into the second section of the installation. Here the conveyors are stopped again, the mechanism removes the double-layer block from the central conveyor, transfers it along the guides and places it atop a cake block located on the left-hand conveyor. In this way a three-layer cake block is formed. Then, the three-layer cake block is delivered to the mechanism for the application of the pastry mass onto the sides of the cake block and for sprinkling it with crumblings. The valves feeding the pastry mass and crumblings are controlled by the electric control board. The pastry mass and crumblings are applied first onto the lateral sides of the cake block, and then onto the longitudinal sides thereof.

Next, the cake block is placed into a box.

After the conveyor is stopped, the table of the lifting and lowering appliance lifts the cake block above the level of the holder plates. Then the plates of the holder close and the table goes down thus leaving the cake block on the closed plates of the holder. The table moves down to the level of the guides 106 of the box store 13, and stops in this position. The pusher 107 pushes out one of the boxes along the guides 106 from the box store 13 onto the table and then retracts. The plates of the holder move apart and the cake block is placed into the box located on the table. The latter moves down leaving the box with the cake block on a slat of the conveyor 1 which carries the box out of the installation.

What is claimed is:

1. An installation for the production of multi-layer cakes comprising a number of parallel conveyors for supporting cake blocks along a common line transverse to the direction of travel of the conveyors, each conveyor being adapted for carrying at least one cake block, means located above said conveyors and including nozzles for the simultaneous application of a pastry mass onto the top surfaces of the cake blocks in a line, means located above said conveyors and downstream of the first said means for juxtaposing the cake blocks on top of one another to form a multi-layer cake, the latter means including a mechanism for transferring a cake block from one conveyor to the next adjacent conveyor in the transverse direction relative to the direction of travel of said conveyors.

2. An installation as claimed in claim 1 in which each of the conveyors comprises rectangular slats fastened to chains, said slats being of a slotted type.

3. An installation as claimed in claim 1, in which the means for juxtaposing the cake blocks comprises a carriage which reciprocates across said conveyors, said carriage including holders in the form of plates which close and move apart under the cake block, means for opening and closing said holder plates and including a cam-and-link drive, and a cross-member which reciprocates along the axis of said conveyors, each holder including a sliding key fixed thereto, said cross-member being connected to said holder through said sliding key.

4. An installation as claimed in claim 3 in which the holder plates are sheathed with a flexible band and located in a housing fastened to said carriage.

5. An installation as claimed in claim 4 comprising means for pouring syrup on one-layer cake blocks including a valve, a removable plate installed under said valve, nozzles located on said plate, a spring-loaded plate with a flexible lining material, said spring-loaded plate being installed within said valve for simultaneously shutting off all the nozzles, an electromagnet with a lift-drop rod connected to said spring-loaded plate, and automatic balance means for receiving one-layer cake blocks being impregnated with syrup to control the valve and regulate the amount of syrup poured onto the blocks, said balance having a scale with a contact relay located in the middle thereof for shutting off said valve through said electromagnet when the weight of a syrup-impregnated cake block reaches a specified value, said balance having a pan carrying a lift-drop table driven by a cam-and-link mechanism for removing the cake block from the conveyor slat for weighing said cake block.

6. An installation as claimed in claim 5 comprising means for lifting and lowering of the table relative to the means which applies the pastry mass to the cake blocks, said means for lifting and lowering the table comprising a non-rotatable screw supporting the table, a bushing with a female thread threadably receiving said screw, a drive for said bushing including a bevel gear transmission, said transmission having a rotatable control shaft with a drive gear thereon, a hollow shaft, a gear wheel mounted on said hollow shaft, and engaging said drive gear, said bushing being inside said hollow shaft and connected to the latter by means of a key.

7. An installation as claimed in claim 6 comprising a carriage for the application of pastry mass onto the side surfaces of a cake block and for sprinkling it with crumblings, said carriage reciprocating in the longitudinal and transverse directions in relative to the conveyor, said carriage including nozzles for spraying pastry mass and means for applying crumblings, said installation also including a vibratory hopper for receiving crumblings, and means connecting said hopper to said means which applies crumblings, the connecting means including hoses ad ejectors for feeding the crumbligs by compressed air.

8. An installation as claimed in claim 7 comprising means for placing multi-layer cake blocks into boxes including a vertical store accommodating the boxes, said store being provided with a pusher located in the lower portion thereof, and with guides for removing the boxes from said store, said installation further comprising a lift-drop table for the removal of finished cake blocks from the conveyor slats, with the holders located above said table, said holders being constructed to open and close under the cake blocks.

References Cited

UNITED STATES PATENTS

| 1,432,701 | 10/1922 | Lawrence | 118—24 |
| 2,260,686 | 10/1941 | Segrin. | |
| 2,391,937 | 1/1946 | Arvidson. | |
| 2,846,960 | 8/1958 | Govatsos. | |
| 3,230,926 | 1/1966 | MacManus. | |

WIWLLIAM I. PRICE, Primary Examiner

ROBERT I. SMITH, Assistant Examiner

U.S. Cl. X.R.

107—45; 118—16